(12) United States Patent
Bresniker

(10) Patent No.: US 8,347,005 B2
(45) Date of Patent: Jan. 1, 2013

(54) MEMORY CONTROLLER WITH MULTI-PROTOCOL INTERFACE

(75) Inventor: Kirk M. Bresniker, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1154 days.

(21) Appl. No.: 11/882,264

(22) Filed: Jul. 31, 2007

(65) Prior Publication Data

US 2009/0037641 A1 Feb. 5, 2009

(51) Int. Cl.
*G06F 3/00* (2006.01)
*G06F 13/12* (2006.01)
*G06F 13/42* (2006.01)
*G06F 13/20* (2006.01)
*G06F 13/36* (2006.01)
*G06F 12/00* (2006.01)
*H04L 12/28* (2006.01)

(52) U.S. Cl. .......... 710/74; 710/2; 710/62; 710/64; 710/105; 710/313; 710/315; 711/2; 711/104; 711/105; 711/154; 711/168; 711/170; 370/395.5

(58) Field of Classification Search .......... None
See application file for complete search history.

(56) References Cited

U.S. PATENT DOCUMENTS

| | | | | |
|---|---|---|---|---|
| 5,471,603 A * | 11/1995 | Yokote et al. | | 711/2 |
| 5,651,129 A * | 7/1997 | Yokote et al. | | 711/104 |
| 5,982,655 A * | 11/1999 | Doyle | | 365/63 |
| 6,092,146 A * | 7/2000 | Dell et al. | | 711/5 |
| 6,563,739 B2 * | 5/2003 | Aho et al. | | 365/185.23 |
| 6,681,301 B1 * | 1/2004 | Mehta et al. | | 711/154 |
| 6,777,979 B1 * | 8/2004 | Zhu et al. | | 326/41 |
| 6,877,076 B1 * | 4/2005 | Cho et al. | | 711/157 |
| 6,889,284 B1 * | 5/2005 | Nizar et al. | | 710/315 |
| 6,944,731 B2 * | 9/2005 | Bouchard et al. | | 711/161 |
| 7,096,306 B2 * | 8/2006 | Riley | | 710/313 |
| 7,379,316 B2 * | 5/2008 | Rajan | | 365/63 |
| 7,480,303 B1 * | 1/2009 | Ngai | | 370/395.5 |
| 7,516,293 B2 * | 4/2009 | Baska et al. | | 711/170 |
| 8,170,402 B2 * | 5/2012 | Frost-Ruebling et al. | | 386/338 |
| 2003/0084233 A1 * | 5/2003 | Williams | | 711/105 |
| 2003/0217244 A1 * | 11/2003 | Kelly | | 711/168 |
| 2005/0033909 A1 * | 2/2005 | Chang et al. | | 711/105 |
| 2005/0105369 A1 * | 5/2005 | Schoenfeld | | 365/227 |
| 2006/0256603 A1 * | 11/2006 | Foster | | 365/63 |
| 2008/0082766 A1 * | 4/2008 | Okin et al. | | 711/154 |
| 2008/0091888 A1 * | 4/2008 | Sandy | | 711/154 |
| 2008/0126690 A1 * | 5/2008 | Rajan et al. | | 711/105 |
| 2008/0186667 A1 * | 8/2008 | Verdiell et al. | | 361/686 |
| 2008/0229049 A1 * | 9/2008 | Nanda et al. | | 711/173 |
| 2008/0313319 A1 * | 12/2008 | Geffin | | 709/223 |

* cited by examiner

*Primary Examiner* — Chun-Kuan Lee
*Assistant Examiner* — Henry Yu

(57) ABSTRACT

A multi-protocol memory controller includes one or more memory channel controllers. Each of the memory channel controllers coupled to a single channel of DIMM, where the DIMM in each single channel operate according to a specific protocol. A protocol engine is coupled to the memory channel controllers. The protocol engine is configurable to accommodate one or more of the specific protocols. Finally, a system interface is coupled to the protocol engine and is configurable to provide electrical power and signaling appropriate for the specific protocols.

17 Claims, 3 Drawing Sheets

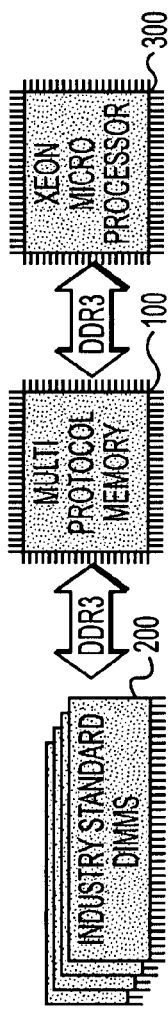
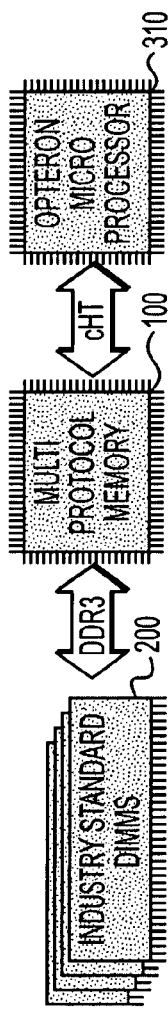
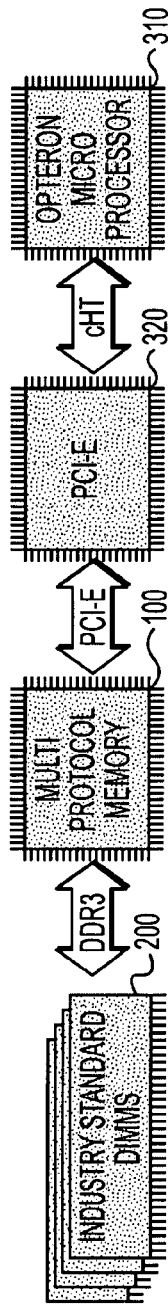
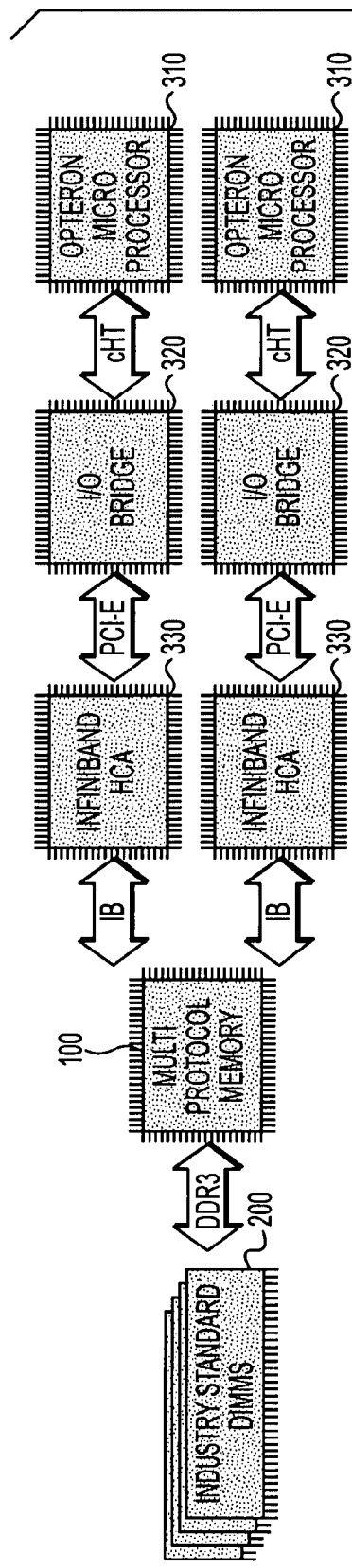

MEMORY CONTROLLER WITH MULTI-PROTOCOL INTERFACE

BACKGROUND

Present-day multi-core processor architectures often employ memory controllers on die with the processors. This arrangement has the advantage, in terms of system density, that memory bandwidth scales at least linearly with the number of CPU sockets, thereby providing low latency between the cores and the memory controllers. The disadvantage of this arrangement is that the desired ratio of memory controllers to processors is higher that the limits imposed by integrating cores and memory controllers.

To expand memory capacity, current architectures include those with multiplexers multiplex to route independent memory busses into a single bus. This solution, however, requires running the secondary busses at lower performance levels and impose restrictions on the physical distance that the additional memory can be placed away from the memory controllers. Other solutions include fully buffered (FB)-DIMMs that allow DIMM daisy chaining. FB-DIMMS require the addition of a buffer on every DIMM, and increases latency for any access with each FB-DIMM added.

DESCRIPTION OF THE DRAWINGS

The detailed description will refer to the following drawings in which like numerals refer to like items, and in which:

FIG. 3 illustrates exemplary implementations of the memory controller.

DETAILED DESCRIPTION

Figure 1:
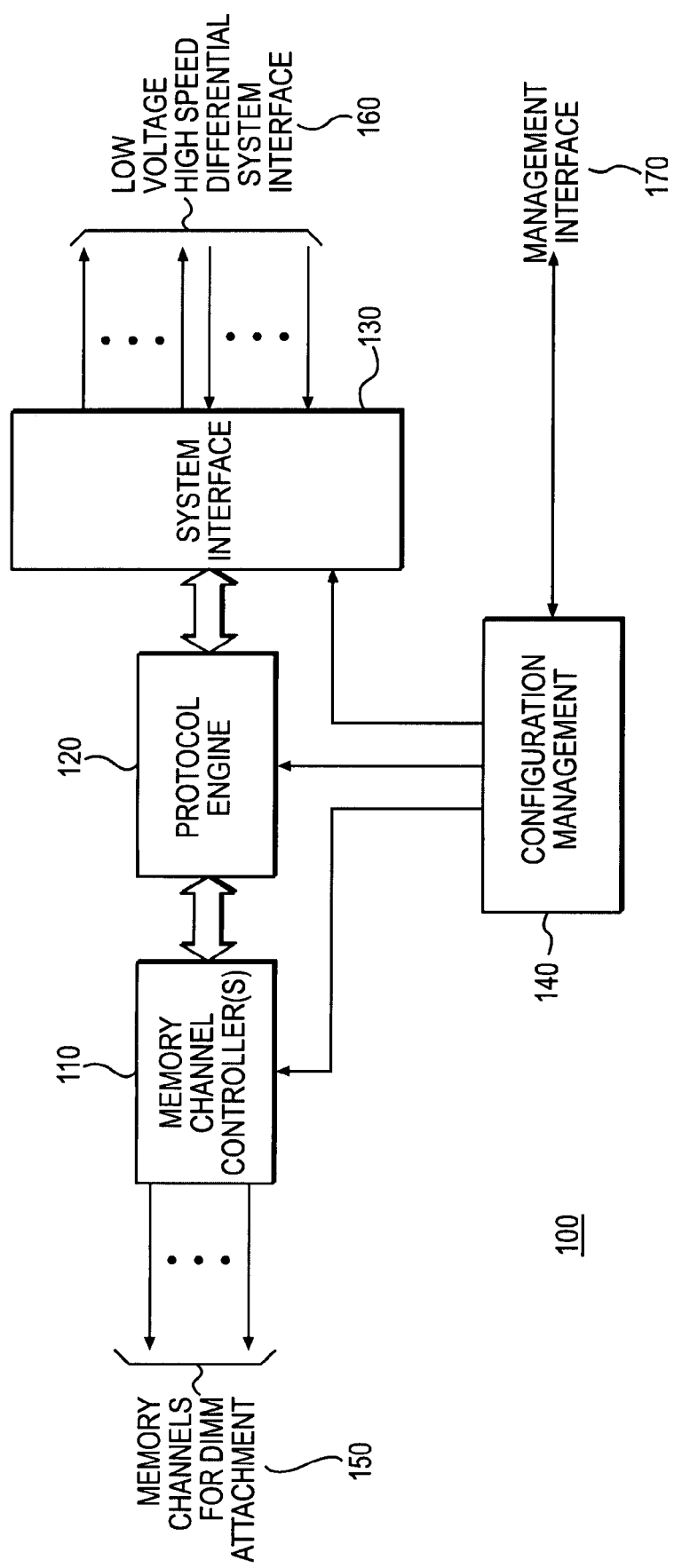
FIG. 1 is an overall block diagram of an exemplary memory controller that can accommodate multiple protocols.

Modern computer memories use double data rate (DDR) dynamic RAM (DRAM) technology, with the latest version being DDR3 (for DDR three synchronous). DDR technology means that the data transfer rate is twice the clock rate. DDR3 technology memory can run its bus at four times the speed of the memory cells it contains, albeit at a cost of higher latency. More specifically, the frequencies of DDR3 memory are raised beyond those of DDR2 due to doubling of the data prefetch that was moved from the information storage device to an input/output buffer. While DDR2 DRAM uses 4-bit samples, DDR3 DRAM uses 8-bit prefetch also known as 8n-prefetch. In other words, DDR3 DRAM technology implies doubling of the internal bus width between the actual DRAM core and the input/output buffer. As a result, the increase in the efficient data transfer rate provided by DDR3 DRAM does not require faster operation of the memory core. Only the external buffers work faster. The core frequency of the memory chips, it appears 8 times lower than that of the external memory bus and DDR3 buffers (this frequency was 4 times lower than that of the external bus by DDR2).

These DDR DRAM modules are installed in a dual inline memory module (DIMM). A modern DIMM module may have a memory capacity of 1 GB to 16 GB or more.

A typical DIMM will have eight DRAM modules installed in a single rank. A rank represents all the DRAM modules selected when a memory controller executes a memory transaction. A rank can extend across 1, 2, or 4 DIMMs, depending on the memory sub-system architecture. A single rank DIMM provides eight bytes (64 bits) of data outputs. Current DIMMs can have 1, 2, or 4 ranks. Theoretically, the number of ranks on a DIMM could be eight or more. A DIMM with two ranks may have eight DRAM modules installed on one side of a planar, and another eight DRAM modules installed on the opposite side of the planar. The DIMM is then installed into clips on a computer system motherboard. The motherboard can be configured to hold any number of DIMMs, subject to the usual constraints of motherboard size, heat loading, and other factors.

A DIMM channel represents all the DIMMS connected to the same data bits. A memory controller can control 1, 2, or 4 DIMM channels operating in lockstep. The number of DIMMs on a DIMM channel depends on the memory technology (DDR1, DDR2, DDR3, etc.) and memory sub-system operating frequency. For example, DDR1 technology allows up to four 2-rank DIMMs operating at 200 MT/s on a channel while DDR3 technology allows up to two 4-rank DIMMs per channel operating at 1067 MT/s.

To allow further memory expansion in a host processor system such as that described above, regardless of the protocols employed by the system processors, and regardless of the operating characteristics of the host system, a memory controller includes one or more memory channel controllers, with each of the memory channel controllers coupled to a separate memory channel for DIMM attachment. The memory channels are coupled to a protocol engine that is configurable to run one of several protocols, depending on the specific memory device used with the DIMMs. The protocol engine connects to a system interface. The system interface is a hardware layer between the protocol engine and the host processor system. The system interface provides generic, high-speed, low voltage differential signaling that matches the electrical and functional requirements of the equivalent protocol currently being hosted in the protocol engine.

FIG. 1 is an overall block diagram of the hardware components of an exemplary memory controller 100. The memory controller 100 allows expansion memory capacity to be added to microprocessors from several different vendors, at multiple locations, and both inside and outside the coherency domain. In one embodiment, the memory expansion is achieved by connecting the memory controller 100 to a multi-system interconnect such as an IB or Ethernet connection.

The memory controller 100 couples multiple memory channels 150 for DIMM attachment to a host processor system 160. Each of the DIMM memory channels connects to a memory channel controller 110, such that there is one memory channel controller 110 for each DIMM channel 150. The multiple memory channel controllers 110 are coupled to a single protocol engine 120, which in turn connects to system interface 130. Finally, configuration management module 140 connects to the memory controllers 110, protocol engine 120, and system interface 130, as well as to a management interface layer 170.

The DIMM memory channels 150 contain any number of DIMMs. The DIMMs may be of any technology, such as fully buffered DIMMs (FB-DIMMs), for example. Furthermore, each channel may employ different types of DIMM, and/or DIMMs from different manufacturers.

The memory channel controllers 110 are hardware devices that perform the functions of memory address decoding, read/write operations, and memory refreshing. The memory channel controllers 110 include advanced error correction such as double chip spare, thereby enabling a reliable memory sub-system. The memory channel controllers 110 also include a very low power hibernation mode that allows the DIMMs to remain refreshed and active at very low power levels.

Coupled to the memory channel controllers 110 is the protocol engine 120, which is a lightweight hardware layer between the memory channel controllers 110 and the system interface 130. The protocol engine 120 is configurable to run one of several memory protocols, including cHT or CSI cache coherency protocols, fully buffered DIMM protocol, PCI-E protocol, and IB or Ethernet with iWARP/RDMA protocol. In an embodiment, the protocol engine 120 is pre-programmed with a plurality of protocols, such as those stated above. In an alternate embodiment, the appropriate protocol is loaded into the protocol engine 120 from the configuration management module 140. When the host system is fully configured, or at some later time is reconfigured, a host system user can select the protocol that is appropriate for the installed, or reconfigured, memory devices.

The system interface 130 is a hardware layer that connects the protocol engine 120 to the host system. The system interface 130 can be configured to match the electrical and functional requirements of the equivalent protocol currently being hosted in the protocol engine 120.

Finally, a configuration management module 140 is coupled to the memory channel controllers 110, the protocol engine 120, and the system interface 130. The configuration management module 140 is a hardware layer that allows the host system user, or other person, to interface with the components of the memory controller 100 to configure such components according to the memory devices attached to the memory channel controllers 110. The configuration management module 140 provides a signal path to management interface 170 so that the system user can view possible protocol and system selection options, and make an appropriate selections from among the options.

Because it is configurable according to a device's protocol and electrical requirements, the memory controller 100 can serve as the host system's primary coherent memory controller, a secondary expansion memory controller, and a secondary non-coherent I/O based intra-system or intra-partition memory controller.

Figure 2:
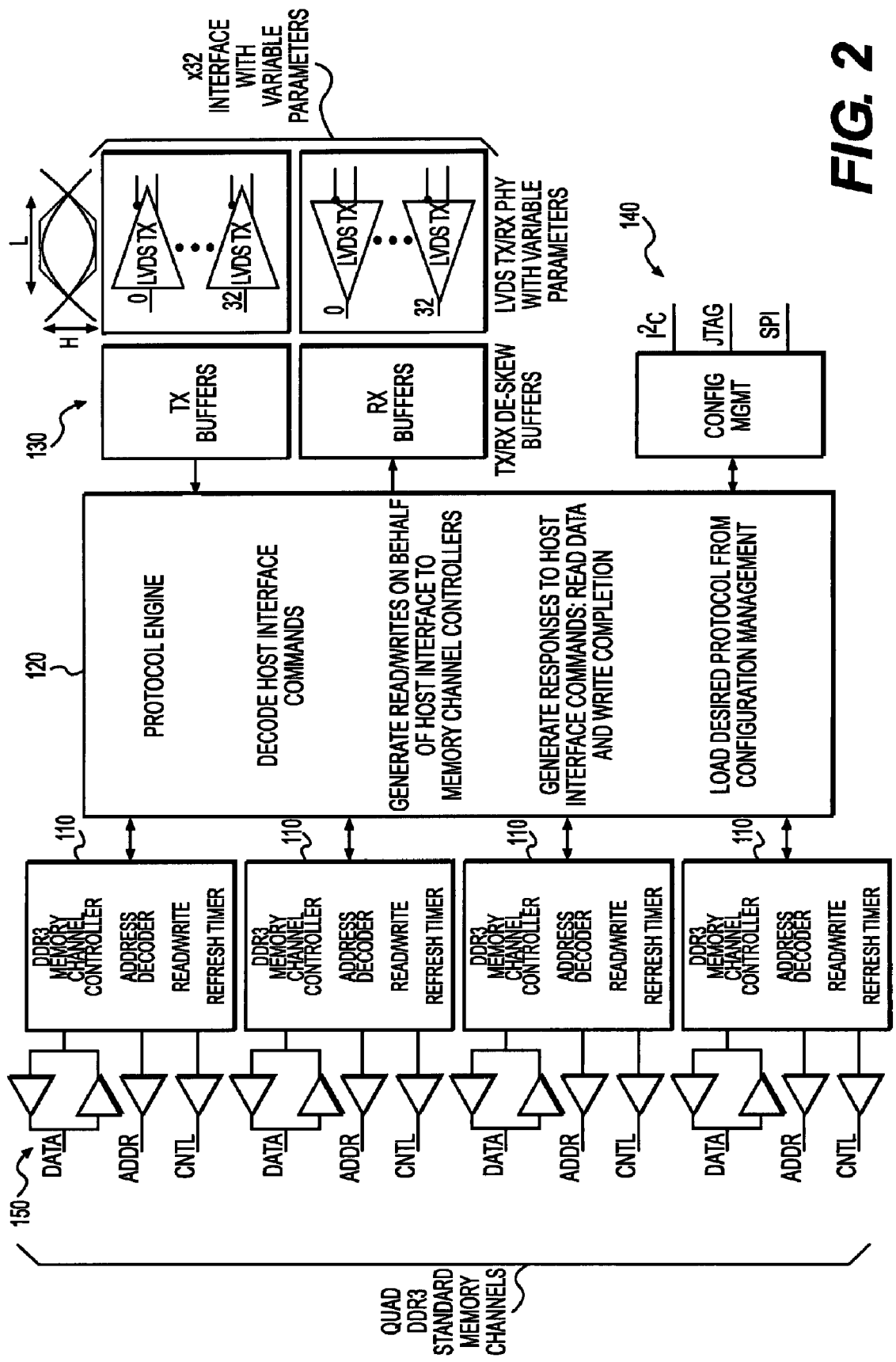
FIG. 2 is an expanded diagram of the memory controller of FIG. 1.

FIG. 2 is a more detailed view of selected components of the memory controller 100 of FIG. 1. In the illustrated embodiment, the memory channel controllers 110 provide data input/output (read/write) functionality for DDR3 memory devices. The memory controllers 110 also provide refresh operations, including a low power hibernation mode, and memory address location decoding functions.

The protocol engine 120 decodes host system interface commands, generates reads/writes on behalf of the host system interface to the memory channel controllers, and generates responses to host system commands. The appropriate protocol for operating the memory devices can come pre-loaded in the protocol engine 120, or may be loaded from the configuration module 140. In an embodiment, the host system includes memory channels using different protocols and the protocol engine 120 is configured to accommodate each of the different protocols. In this alternate embodiment, the protocol engine 120 includes a memory channel identifier that matches a specific memory channel with its appropriate protocol.

The system interface 130 includes, in an embodiment, transmit and receive (TX and RX) deserializer (DE)-skew buffers. Also included are low voltage differential signaling (LVDS) drivers for the RX and TX buffers. To improve the rate of data transmission over that of a single, serial LVDS, the system interface 130 includes parallel LVDS drivers. The system interface 130, when the protocol engine 120 is configured to accommodate multiple protocols, includes the necessary buffers and drivers, and programming, to supply electrical power and signaling to the different memory channels according to the protocols used by those memory channels.

FIGS. 3A-3D illustrate examples of memory subsystem configurations for vendor-specific devices and corresponding protocols. FIG. 3A shows an industry standard DIMM 200 coupled to multi-protocol memory controller 100 and XEON™ microprocessor 300 using DDR3 protocols.

FIG. 3B shows industry standard DIMM 200 coupled to multiprotocol memory controller 100 and OPTERON™ microprocessor 310 using cHT protocols.

FIG. 3C shows industry standard DIMM 200 coupled to multi-protocol memory controller 100, PCI-E card 320, and OPTERON™ microprocessor 310 using DDR3, PCI-E, and cHT protocols.

FIG. 3D shows DIMM 200 coupled to multi-protocol memory controller 100 using DDR3 protocols. The memory controller 100 connects to two channels of INFINIBAND™ HCA 330, an I/O Bridge 320, and OPTERON™ microprocessor 310 using IB, PCI-E, and cHT protocols.

What is claimed is:

1. A multi-protocol memory controller, comprising:
memory channel controllers, each of the memory channel controllers coupled to a single channel of DIMM, wherein the DIMM in each single channel operate according to a specific protocol;
a protocol engine coupled to the memory channel controllers, wherein the protocol engine is configurable to accommodate at least two or more of the specific protocols, wherein the specific protocols is selected from a list of fully buffered DIMM protocol, PCI-E protocol, Ethernet with iWARP/RDMA protocol, cHT protocol, and CSI cache coherency protocol; and
a system interface coupled to the protocol engine and configurable to provide electrical power and signaling appropriate for the specific protocols.

2. The controller of claim 1, wherein the memory channels comprise one or more first memory channels having memory devices operable according to a first protocol and one or more second memory channels operable according to a second protocol.

3. The controller of claim 1, wherein the DIMM are DDR3 DIMM.

4. The controller of claim 1, wherein the system interface comprises:
TX and RX deserializer skew buffers; and
LVDS drivers.

5. The controller of claim 1, wherein the protocol engine is pre-loaded with memory device protocols.

6. The controller of claim 1, wherein the protocol engine is loaded with appropriate protocols upon configuration of a corresponding host system and memory sub-system.

7. The controller of claim 1, wherein the memory channel controllers provide a very low power hibernation mode that allows the DIMM to remain refreshed and active.

8. The controller of claim 1, wherein the memory channel controllers, the protocol engine, and the system interface, are coupled to a configuration management module, and wherein the configuration management module is operable to configure the protocol engine and the system interface.

9. The controller of claim 1, wherein the controller provides coherent memory control and non-coherent input/output.

10. A multi-protocol memory controller for use with a host computing system, comprising:

means for controlling operation of channels of memory, the memory channels comprising one or more different types of memory devices, wherein the means for controlling, further comprises:

memory channel controllers, wherein each of the memory channel controllers is for one of the memory channels, wherein each of the memory channel controllers are coupled to a single memory channel and wherein the memory device in each single channel operates according to a single protocol;

a protocol engine coupled to the memory channel controllers, wherein the protocol engine is configurable to accommodate at least two or more specific memory device protocols, wherein the specific memory device protocols is selected from a list of fully buffered DIMM protocol, PCI-E protocol, Ethernet with iWARP/RDMA protocol, cHT protocol, and CSI cache coherency protocol; and means for selecting protocols appropriate to the memory devices; and means for supplying signaling and electrical power from the host computing system to the memory devices.

11. The multi-protocol memory controller of claim 10, wherein the means for selecting protocols comprises a configuration management module, and wherein the configuration management module provides for one or more of automatic selection of a protocol based on identification of a memory type and user selection of the protocol.

12. The multi-protocol memory controller of claim 10, further comprising a system interface, wherein the system interface comprises:

TX and RX deserializer skew buffers; and

LVDS drivers.

13. The multi-protocol memory controller of claim 10, further comprising means for placing the multi-protocol memory controller and the memory devices in a low-power mode that allows a DIMM to remain refreshed and active.

14. A multi-protocol memory controller coupled to one or more channels of memory devices, all the memory devices in a specific channel operating according to a same protocol, the memory controller, comprising:

a first memory channel controller coupled to a first single memory channel of a first memory device;

a second memory channel controller coupled to a second single memory channel of a second memory device, wherein each of the memory channel controllers is coupled to a single channel of memory devices, wherein the memory device in each single channel operates according to a specific protocol;

a protocol engine configurable to operate a plurality of protocols, wherein the protocol is selected from a list of fully buffered DIMM protocol, PCI-E protocol, Ethernet with iWARP/RDMA protocol, cHT protocol, and CSI cache coherency protocol; and means for selecting one or more of the plurality of protocols depending on types of the memory devices in the memory channels.

15. The multi-protocol memory controller of claim 14, further comprising an interface to provide signaling and power from one or more devices external to the memory devices.

16. The multi-protocol memory controller of claim 14, wherein the channels of memory comprise the first memory channel having the first memory device operable according to a first protocol and the second memory channel having the second memory device operable according to a second protocol.

17. The multi-protocol memory controller of claim 14, further comprising a low power sleep mode useable to minimize power consumption.

* * * * *